United States Patent
Cai et al.

(10) Patent No.: US 8,166,323 B2
(45) Date of Patent: *Apr. 24, 2012

(54) THREAD MIGRATION TO IMPROVE POWER EFFICIENCY IN A PARALLEL PROCESSING ENVIRONMENT

(75) Inventors: Qiong Cai, Barcelona (ES); José González, Terrassa (ES); Pedro Chaparro Monferrer, Barcelona (ES); Grigorios Magklis, Barcelona (ES); Antonio González, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/089,049

(22) Filed: Apr. 18, 2011

(65) Prior Publication Data

US 2011/0197195 A1    Aug. 11, 2011

Related U.S. Application Data

(63) Continuation of application No. 11/968,060, filed on Dec. 31, 2007, now Pat. No. 7,930,574.

(51) Int. Cl.
*G06F 1/32* (2006.01)
(52) U.S. Cl. .......... 713/322; 713/323; 713/375
(58) Field of Classification Search .......... 713/300–340, 713/375
See application file for complete search history.

(56) References Cited

U.S. PATENT DOCUMENTS

| | | | |
|---|---|---|---|
| 4,611,289 A | 9/1986 | Coppola | |
| 5,287,508 A | 2/1994 | Hejna, Jr. et al. | |
| 5,515,538 A | 5/1996 | Kleiman | |
| 6,230,313 B1 | 5/2001 | Callahan, II et al. | |
| 6,272,517 B1 * | 8/2001 | Yue et al. | 718/102 |
| 6,651,163 B1 | 11/2003 | Kranich et al. | |
| 6,681,384 B1 | 1/2004 | Bates et al. | |
| 7,039,794 B2 | 5/2006 | Rodgers et al. | |
| 7,069,189 B2 | 6/2006 | Rotem | |
| 7,082,604 B2 | 7/2006 | Schneideman | |
| 7,178,062 B1 * | 2/2007 | Dice | 714/38.13 |
| 7,318,164 B2 | 1/2008 | Rawson, III | |
| 7,380,039 B2 * | 5/2008 | Miloushev et al. | 710/244 |
| 7,424,630 B2 | 9/2008 | Horvath | |
| 7,664,936 B2 * | 2/2010 | Jensen et al. | 712/214 |
| 7,676,809 B2 * | 3/2010 | Vaidyanathan et al. | 718/103 |
| 7,890,298 B2 * | 2/2011 | Coskun et al. | 702/186 |
| 7,930,695 B2 * | 4/2011 | Chaudhry et al. | 718/100 |
| 2005/0050307 A1 | 3/2005 | Reinhardt et al. | |

(Continued)

OTHER PUBLICATIONS

Sridharan et al, "Thread Migration to Improve Synchronization Performance" University of Notre Dame 2006.*

(Continued)

*Primary Examiner* — Paul R Myers
(74) *Attorney, Agent, or Firm* — Blakely, Sokoloff, Taylor & Zafman LLP (57) ABSTRACT

A method and system to selectively move one or more of a plurality threads which are executing in parallel by a plurality of processing cores. In one embodiment, a thread may be moved from executing in one of the plurality of processing cores to executing in another of the plurality of processing cores, the moving based on a performance characteristic associated with the plurality of threads. In another embodiment of the invention, a power state of the plurality of processing cores may be changed to improve a power efficiency associated with the executing of the multiple threads.

17 Claims, 5 Drawing Sheets

U.S. PATENT DOCUMENTS

| | | | |
|---|---|---|---|
| 2006/0117202 | A1 | 6/2006 | Magklis et al. |
| 2006/0123251 | A1* | 6/2006 | Nakajima et al. ............ 713/300 |
| 2008/0310099 | A1 | 12/2008 | Monferrer et al. |
| 2009/0000120 | A1 | 1/2009 | Shiino et al. |
| 2009/0077329 | A1 | 3/2009 | Wood et al. |
| 2009/0089782 | A1 | 4/2009 | Johnson et al. |
| 2009/0094438 | A1 | 4/2009 | Chakraborty et al. |
| 2009/0150893 | A1 | 6/2009 | Johnson et al. |
| 2009/0320031 | A1* | 12/2009 | Song ............................ 718/102 |

OTHER PUBLICATIONS

Jenks et al, "A multithreaded Runtime System With Thread Migration for Distributed Memory Parallel Computing", University of California, Irvine 2007.*

"Notice of Allowance for U.S. Appl. No. 11/968,060", (Dec. 16, 2010), Whole Document.

"Office Action for pending U.S. Appl. No. 11/968,060", (Aug. 19, 2010), Whole Document.

Cai, Qiong, et al., "P25192 U.S. Appl. No. 11/714,938, filed Mar. 7, 2007 Meeting Point Thread Characterization", Whole Document.

Chakraborty, et al., "Employing Hardware Migration to Specialize CMP Cores On-the-fly", (Oct. 2006), 1-10.

Li, Jain, et al., "The Thrifty Barrier: Energy-Aware Synchronization in Shared-Memory Multiprocessors", Appears in Intl. Symp. on High-Performance Computer Architecture (HPCA), Madrid, Spain, Feb. 2004, Whole Document.

Liu, Chun, et al, "Exploiting Barriers to Optimize Power Consumption of CMPs", Dept. of Computer Science and Eng., The Pennsylvania State University, University Park, PA 16802., Whole Document, Apr. 18, 2005.

Magklis, Grigorios, et al., "P20449 U.S. Appl. No. 10/999,786, filed Nov. 29, 2004 A Frequency and Voltage Scaling Architecture", (Jun. 1, 2006), Whole Document.

* cited by examiner

THREAD MIGRATION TO IMPROVE POWER EFFICIENCY IN A PARALLEL PROCESSING ENVIRONMENT

RELATED APPLICATION

This Application is a Continuation of, and claims the benefit of, U.S. patent application Ser. No. 11/968,060, filed Dec. 31, 2007, which is to issue as U.S. Pat. No. 7,930,574.

BACKGROUND OF THE INVENTION

1. Field of the Invention

The invention relates generally to parallel processing in a multiple processing core environment. More particularly, embodiments of the invention relate to selectively moving threads executing in parallel to improve power efficiency in the multiple processing core environment.

2. Background Art

In computer systems, a processor may have one or more cores. A core may be tasked with running one or more threads. Thus, a multi-core processor may be tasked with running a large number of threads. These threads may run at different speeds. When the threads are related to each other, as they are when they are associated with a parallel application, imbalances in thread execution speed and thus thread completion time may represent power inefficiencies. These inefficiencies may exist, for example, in a single, multi-core processor system or in a multiple processor system (e.g., simultaneous multithreading system (SMT), chip level multithreading system (CMP)) running parallel applications.

If a core is running multiple threads, each of which is handling a portion of a parallel workload, and one of the threads is running slower than the other thread(s), then that thread will likely complete its assigned portion of a parallel workload after the other(s). The other thread(s) having to wait is indicative of wasted energy. For example, if n (n being an integer greater than one) cores exist, but m (m being an integer less than n) cores are idle because they are waiting for another core(s) to complete, then processing power is being wasted by the m cores unnecessarily completing their respective tasks too quickly. In some systems, threads that complete their work ahead of other threads may be put to sleep and thus may not consume power. However, putting a core to sleep and then waking up the core consumes time and energy and introduces computing complexity. In a tera-scale environment, tens or even hundreds of cores in a processor may run highly parallel workloads. In this environment, tens or even hundreds of cores may be waiting for a slow core to complete, multiplying power inefficiency caused by workload imbalances between cores.

As used herein, a "critical" thread is understood to mean a thread which is executing in parallel with another thread and which is expected to cause a processor executing the other thread to wait idly for a completion of a task of the critical thread. Previous technologies to improve power efficiency in a parallel processing environment have included reconfiguring the execution of a thread by a particular processing core— e.g. by manipulating one or more configurable attributes of the critical thread and/or the processing core executing the thread. However, there are limited efficiency improvements to be had by variously reconfiguring an execution of a particular thread which is being executed by a particular processing core.

BRIEF DESCRIPTION OF THE DRAWINGS

The various embodiments of the present invention are illustrated by way of example, and not by way of limitation, in the figures of the accompanying drawings and in which.

DETAILED DESCRIPTION

For multi-core parallel computing applications, power efficiency improvements may be found, at least in part, by selectively moving one or more threads among a plurality of processing cores. The selective moving of one or more threads among processing cores, referred to herein as either thread shuffling or thread migration, may be combined with meeting-point synchronization mechanisms to increase power efficiency of a parallel computing system. With meeting-point synchronization, one or more threads of a parallel application may be selectively either slowed down to reduce the energy consumption of the many-core system, or sped up—e.g. by giving higher priority to a critical thread in a core—to reduce idle processing time while a non-critical thread awaits the completion of a critical thread. In an embodiment of the invention, thread migration may result in a redistribution of threads among a plurality of processing cores. In an embodiment, at least one of the cores may further be changed to a lower power state to improve thread synchronization at a lower level of power consumption.

Figure 1:
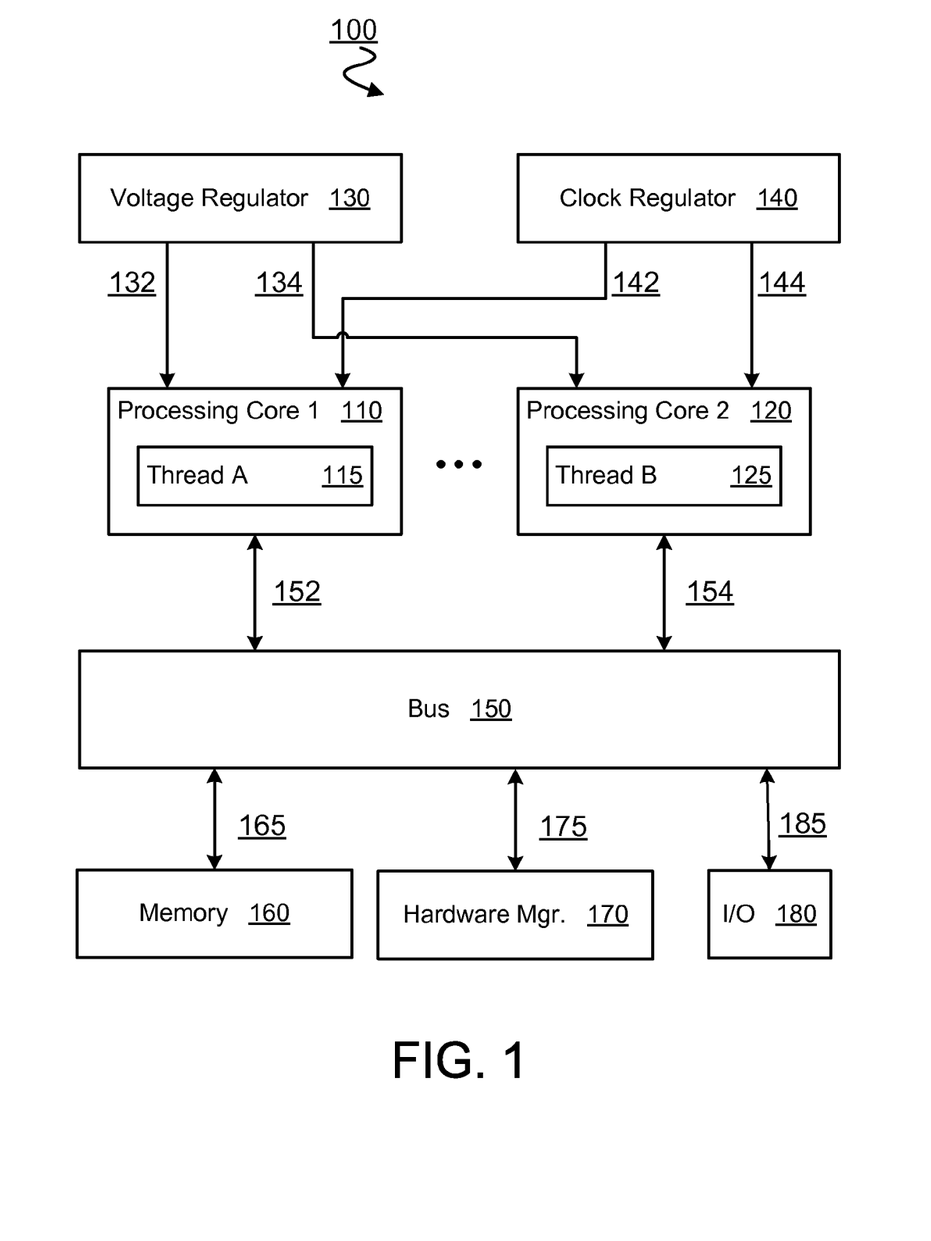
FIG. 1 is a block diagram illustrating a system configured to implement an embodiment of the invention.

FIG. 1 illustrates a system 100 configured to implement an embodiment of the invention. System 100 may include a parallel processing environment which includes a plurality of threads executing in parallel by a plurality of processing cores. Although particular features of an embodiment of the invention are described herein with reference to a processing core 1 110 and a processing core 2 120 of system 100 which are executing, respectively, a thread A 115 and a thread B 125, it is understood that the features may be extended to apply to any of a variety of combinations of multiple threads being executed by multiple processing cores.

As used herein, the phrases "parallel threads" and "threads executing in parallel" are understood to refer to multiple pending executions of one or more sets of instructions, wherein each separate execution is to contribute to a common data processing outcome. A processing core may execute two or more threads by alternating between different instruction set executions. Alternatively or in addition, multiple processing cores may simultaneously perform instruction set executions, each associated with a respective parallel thread. As used herein, the moving of a thread is understood to refer to an interrupting of an initial processing core's executing of a particular set of instructions associated with the particular thread and a further executing of the particular set of instructions by another processing core in lieu of a further executing of the particular set of instructions by the initial processing core.

Processing core 1 110 and a processing core 2 120 may each be provided with one or more supply voltages which are regulated to enable at least in part their respective execution of threads. For example, system 100 may include a voltage regulator 130 which may provide to processing core 1 110 a supply voltage 132 at a supply voltage level which may be regulated. Voltage regulator 130 may additionally provide supply voltage 134 to processing core 2 120 at another supply voltage level which may also be regulated. Also, processing core 1 110 and processing core 2 120 may each be provided with one or more clock signals to coordinate their respective execution of threads. For example, system 100 may include a clock regulator 140 which may provide to processing core 1 110 a clock signal 142 which may be regulated, and which may additionally provide to processing core 2 120 a clock signal 144 which may be regulated.

To facilitate the parallel execution of thread A 115 and thread B 125, system 100 may further include a bus 150 which may allow a data exchange 152 between processing core 1 110 and various components of the system, and/or a data exchange 154 between processing core 2 120 and various components of the system. For example, bus 150 may enable any of a variety of one or more processing cores to variously engage in one or more of an exchange of information 165 with a memory 160, an exchange of information 175 with a hardware manager 170, and an exchange of information 185 with an input and/or output (I/O) 180. Memory 160 may include any of a variety of data storage devices including, but not limited to a hard drive, read-only memory (ROM), random access memory (RAM), such as dynamic RAM (DRAM), EPROMs, EEPROMs, etc. I/O 180 may include any of a variety of devices including, but not limited to, a video monitor, keyboard, speakers, video controller, and any similar device to receive data for parallel processing and/or to provide as data output a result of a parallel processing. As will be discussed below, hardware manager 170 may include any of a variety of combinations of software and hardware elements to regulate the execution of the plurality of threads (e.g. thread A 115 and thread B 125) by the plurality of processing cores (e.g. processing core 1 110 and processing core 2 120).

Figure 2A:
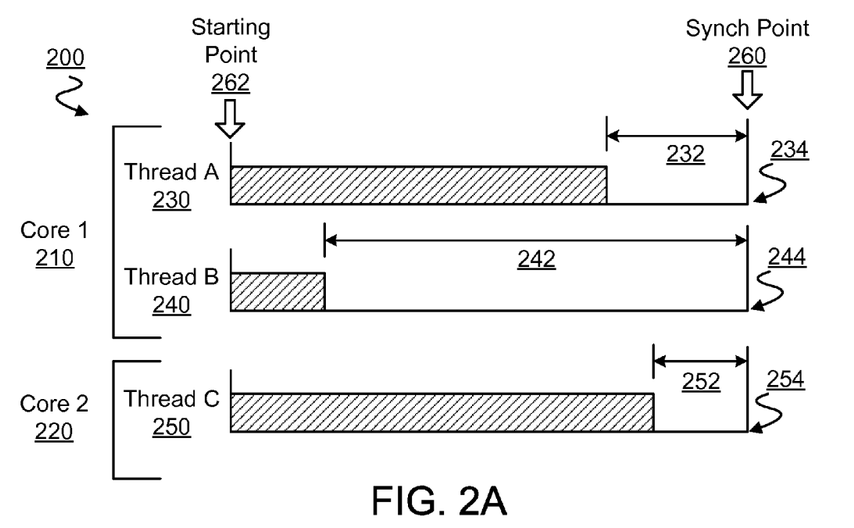
FIG. 2A is a status diagram illustrating a parallel execution of threads prior to a moving of a thread according to an embodiment of the invention.

FIG. 2A shows a status diagram 200 indicating a state of processing performance in a parallel computing system prior to a selective moving of one or more threads according to an embodiment of the invention. Status diagram 200 may represent the performance of a parallel computing system such as system 100, for example. Such a system may include a core 1 210, which may initially be executing a thread A 230 and a thread B 240, and further include a core 2 220, which may initially be executing a thread C 250. Various additional or alternative combinations of threads executing by processing cores may be implemented according to various embodiments of the invention, Thread A 230, thread B 240 and thread C 250 may be executing in parallel—e.g. for the purpose of achieving a data processing result common to the three threads. The parallel execution may include a synchronization of the threads, e.g. by defining a synchronization point 260 wherein each thread has executed to the point of reaching a respective reference point—also referred to herein as a meeting point—associated with the synchronization point 260. A reference point of a given thread may include any of a variety of measures of processing completed by the given thread. For example, a reference point of a given thread may be indicated by or otherwise associated with an address of an instruction that the given thread is to execute—e.g. upon the completing of a particular task of the given thread. The reference point of the given thread may further be associated with a predetermined number of iterations through a particular loop of instructions which the given thread is to have completed as a condition of reaching the respective reference point. By way of illustration, a synchronization point such as synchronization point 260 may be reached when each of thread A 230, thread B 240 and thread C 250 reaches a respective reference point 234, 244 and 254 associated with a respective state of completion of a respective data processing task of each thread.

In a normal parallel processing situation, one thread may reach its respective reference point much earlier than another thread reaches its respective reference point. Often, this results in one or more processing cores spending a large amount of time waiting for slower threads to arrive at their respective reference points, which is not energy-efficient. To reduce power inefficiency due to an idle processing core waiting for a critical thread, an embodiment of the invention evaluates a performance characteristic associated with the plurality of threads in order to identify any threads to move among processing cores. In an embodiment of the invention, this evaluation of a performance characteristic may be made with respect to some starting point 262 to determine for each of one or more threads a respective amount of data processing which remains to be performed. Starting point 262 may represent, for example, a beginning of the execution of thread A 230, thread B 240 and thread C 250 or, alternatively, a respective beginning of an iteration of an instruction loop by each of thread A 230, thread B 240 and thread C 250.

FIG. 2A illustrates a case where, at one particular time, an amount of remaining computation to be performed 242 before thread B 240 reaches reference point 244 may be relatively large when compared to an amount of remaining computation to be performed 232 before thread A 230 reaches reference point 234, and when compared to an amount of remaining computation to be performed 252 before thread C 250 reaches reference point 254. This may be determined by any of a variety of combinations of means including, but not limited to, (1) comparing for each thread an address of a currently executed instruction with an address of a finally executed instruction, (2) counting for each thread a number of iterations through a loop of instructions, and (3) determining for each thread a respective rate of iteration through a particular loop of instructions. The amounts 232, 242 and 252 represent one kind of workload balance among Core 1 210 and Core 2 250. These measurements may indicate that the system faces the prospect of Core 2 250 completing thread C 250 and then having to wait for Core 1 210 to complete one or more of thread A 230 and thread B 240. According to an embodiment of the invention, the workload balance among Core 1 210 and Core 2 250 may be used to determine a way to selectively migrate one or more of threads thread A 230, thread B 240 and thread C 250 among Core 1 210 and Core 2 250 to improve thread synchronization and to create opportunities to improve power efficiency in the system.

Figure 2B:
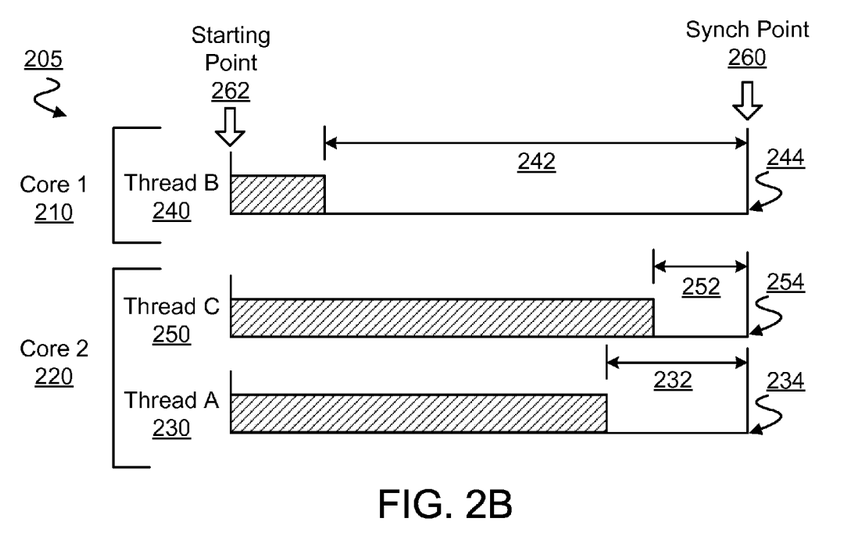
FIG. 2B is a status diagram illustrating a parallel execution of threads after a moving of a thread according to an embodiment of the invention.

FIG. 2B is a state diagram 205 illustrating how, in a system such as one whose performance is represented by state diagram 200, a selective moving of thread A 230, thread B 240 and thread C 250 among core 1 210 and core 2 220 may create an opportunity to improve power efficiency in the system. More particularly, the prospect of Core 2 250 completing thread C 250 and then having to wait for Core 1 210 may be avoided by moving thread A 230 from Core 1 210 to Core 2 220. By way of illustration, a migrating of thread A 230 from Core 1 210 may result in Core 1 210 dedicating more processing time to thread B 240, which may expedite thread B 240 reaching reference point 244. Alternatively or in addition, the migrating of thread A 230 to Core 2 220 may also delay one or more of thread A 230 and thread C 250 reaching, respectively, reference point 234 and reference point 254.

As a result, the reaching of reference points 234, 244 and 254, respectively, by thread A 230, thread B 240 and thread C 250 may be more closely synchronized, thereby reducing any idle time while one processing core waits for another processing core. There is at least one improvement to power efficiency by reducing the effect of a processing core having to wait idly for another core to complete a critical thread. Furthermore, as discussed below, additional improvements may be made by coordinating thread migration with a selective changing of a power state of one or more processing cores.

Figure 3:
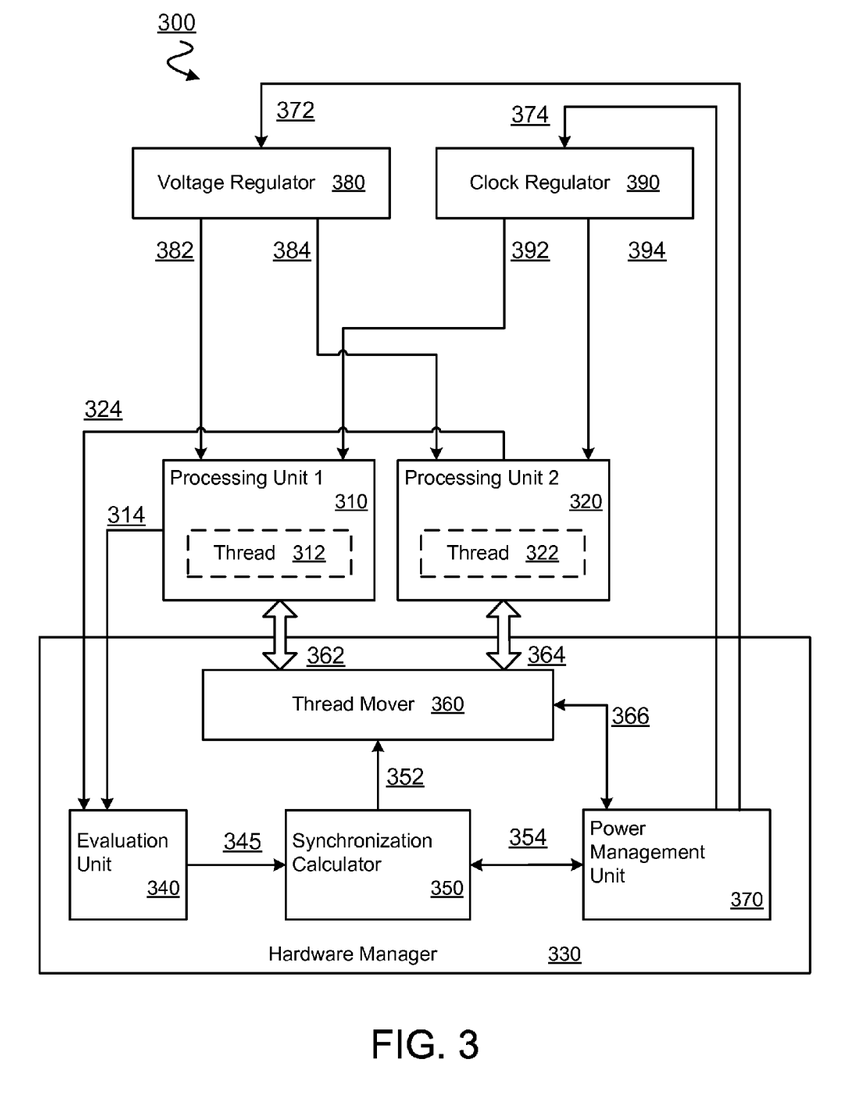
FIG. 3 is a block diagram illustrating a system to improve power consumption in a parallel computing system according to an embodiment of the invention.

FIG. 3 is a block diagram illustrating a system 300 configured to move one or more threads according to an embodiment of the invention. System 300 may be at least part of a parallel computing environment such as system 100, for example. System 300 may include additional elements, not shown for the purposes of illustrating features of the invention, to provide additional features of other embodiments not discussed with respect to FIG. 3. System 300 may include a processing unit 1 310 capable of executing thread 312 and a processing unit 2 320 capable of executing thread 322. The execution of threads 312 and 322 may be regulated with respect to a synchronization point, wherein each of threads 312 and 322 has executed to the point of reaching a respective reference point. At various times in the course of executing threads 312 and 322, a performance characteristic associated with the plurality of threads may be used to determine whether thread synchronization may be improved by selectively moving one or more threads among the plurality of processing cores executing the threads. One such performance characteristic may include a criticality of a given thread—i.e. a measure of whether any other threads are expected to have to wait for the given thread to reach its respective reference point. Criticality of a given thread may be measured as an absolute (e.g. with respect to all other parallel executing threads), or as a relative measure (e.g. with respect to only a subset of all other parallel executing threads).

In order to improve power efficiency, system 300 may include a hardware manager 330 to determine a thread moving plan based on a performance characteristic associated with the parallel threads. Hardware manager 330 may include any of a variety of software and hardware components to receive information indicating a performance characteristic associated with the plurality of threads, and identify, based on the received information, a first thread of the plurality of threads to be moved from executing in one processing core to executing in another processing core. For example, an evaluation unit 340 of hardware manager 330 may determine a criticality of a thread based on one or more of an indication 314 of a performance characteristic of processing unit 1 310 and an indication 324 of a performance characteristic of processing unit 2 320.

In an embodiment of the invention, the evaluation unit 340 will identify a criticality of a thread from among the plurality of threads 312 and 322 and provide an indication 345 of the identified thread criticality to a synchronization calculator 350. Synchronization calculator 350 may be any of a variety of combinations of software and hardware components which may determine a plan for a selective moving of one or more of thread 312 and thread 322 to improve their synchronization. Indication 345 may include an identifier of a given thread and, for example, an indication of the expected time for the given thread to reach a respective reference point associated with a synchronization point of the parallel threads. Alternatively or in addition, indication 345 may include an indicator of an amount of time one or more non-critical threads are expected to idly wait for a critical thread to reach its respective reference point.

Upon receiving indication 345, synchronization calculator 350 may determine a plan for improving thread synchronization which, for example, includes identifying a first thread to be moved. In an embodiment, the plan may rely on or otherwise incorporate meeting-point synchronization mechanisms. In one embodiment of the invention, synchronization calculator 350 may move threads so as to isolate at the processing core level the execution of threads which are less critical from the execution of threads which are more critical. For example, synchronization calculator 350 may create a list of parallel executing threads which is ordered based on an amount of time each thread is expected to wait for a critical thread to reach its respective reference point. The entries of the ordered list may then be grouped to form at least one group of one or more threads which are of lower criticality than the one or more threads of another group. Synchronization calculator 350 may then assign the one or more threads of the more critical group to one processing core, and assign the one or more threads of the less critical group to a different processing core.

Synchronization calculator 350 may then initiate the selective moving of threads according to the assignment of the groups of threads to their respective processing cores. For example, synchronization calculator 350 may transmit a message 352 including an indication of a thread to be moved and a destination processing core for the indicated thread. In an embodiment of the invention, a message 352 from synchronization calculator 350 is received by a thread mover 360 of hardware manager 330. Thread mover 360 may include any of a variety of hardware and software components which direct or otherwise coordinate the moving of a thread from one processing core to another processing core. Upon receiving message 352, thread mover 360 may selectively move thread 312 and/or thread 322 by conducting one or more of an information exchange 362 with processing unit 1 310 and an information exchange 364 with processing unit 2 320. For example, thread mover 360 may send instructions indicating that processing unit 1 310 is to stop executing thread 312, while processing unit 2 320 is to continue the executing of thread 312 in lieu of processing unit 1 310 doing so.

In an embodiment, the moving of one or more threads may create an opportunity to further improve power efficiency, for example, by changing a power state of system 300. Power states of system 300 may be changed, for example, by dynamic voltage/frequency scaling (DVFS), wherein a frequency and/or voltage of one or more cores is re-adjusted based on the redistribution of threads among the plurality of processing cores in order to improve the synchronization of the threads reaching their respective reference points with minimal energy consumption.

For example, the selective moving of one or more threads may isolate the execution of a critical thread by one processing core from the execution of one or more non-critical threads by another processing core. In such a case, there may be an opportunity to improve the efficiency of system 300 by slowing down the processing core executing a non-critical thread so that the completion of the non-critical thread more closely coincides with the completion of the critical thread. Initially, a source of regulated voltage such as voltage regulator 380 may provide to processing unit 1 310 a supply voltage 382 at a first initial supply voltage level, and/or provide to processing unit 2 320 a supply voltage 384 at a second initial supply voltage level. Furthermore, a source of one or more clock signals such as clock regulator 390 may initially provide to processing unit 1 310 a clock signal 392 at a first initial clock frequency and/or provide to processing unit 2 320 a clock signal 394 at a second initial clock frequency. According to an embodiment of the invention, the slowing down of a processing core executing non-critical threads may be accomplished, for example, by a power management unit 370 of the hardware manager 330 which, in response to one or more of communications 366 and 354 from thread mover 360 and synchronization calculator 350, respectively, may send a voltage regulation signal 372 to voltage regulator 380 and/or a clock regulation signal 374 to clock regulator 390.

Based on the output from power management unit 370, voltage regulator 380 and/or clock regulator 390 may adjust their respective operations to change a power state of the processing units. By way of illustration, clock regulation signal 374 may direct clock regulator 390 to reduce clock signal 394 to a clock frequency lower than the second initial clock frequency provided to processing unit 2 320. For example, if processing unit 2 320—initially executing a non-critical thread at a clock frequency f—is expected to be enter an idle state in $t_1$ seconds and is further expected to wait an additional $t_2$ seconds thereafter for completion of a critical thread, then a more efficient clock frequency for processing unit 2 320 would be $f'=f[t_1/(t_1+t_2)]$. By operating at a lower frequency f', processing unit 2 320 may be capable of operating in a lower power state, whereupon voltage regulation signal 372 may direct voltage regulator 380 to reduce supply voltage 384 to a supply voltage level lower than the second initial supply voltage level provided to processing core 2 320. By lowering a power state of a processing core executing a non-critical thread, the execution of the non-critical thread may be slowed so as to more closely synchronize the reaching of a respective reference point by the non-critical thread with the reaching of a respective reference point by the critical thread.

Figure 4:
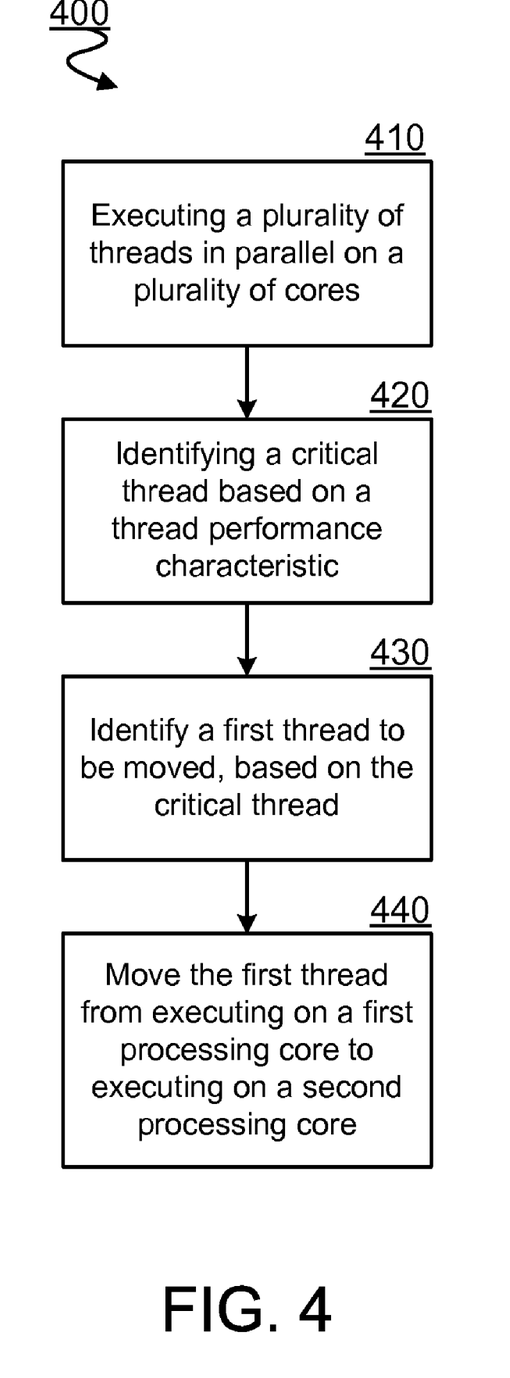
FIG. 4 is a state diagram illustrating an algorithm for moving threads in a parallel computing environment according to an embodiment of the invention.

FIG. 4 is a state diagram illustrating an algorithm 400 for moving threads according to an embodiment of the invention. The algorithm may represent a method performed by a system capable of performing parallel execution of multiple threads by multiple processing cores. The method may be implemented by a system such a system 100, for example. Alternatively or in addition, algorithm 400 may include one or more of the features discussed herein, for example with respect to system 300 of FIG. 3. According to an embodiment of the invention, the algorithm 400 may include, at 410, executing a plurality of threads in parallel by a plurality of processing cores. The algorithm may further include, at 420, identifying a critical thread based on a thread performance characteristic of the plurality of processing cores. Based on the identified critical thread, the algorithm continues, at 430, to identify a first thread to be moved, whereupon, at 440, the first thread may be moved from executing on a first processing core to executing on a second processing core. Although not shown in FIG. 4, in various embodiments of the invention, an algorithm such as algorithm 400 may further include changing a power state of the plurality of processing cores, as variously described herein.

Figure 5:
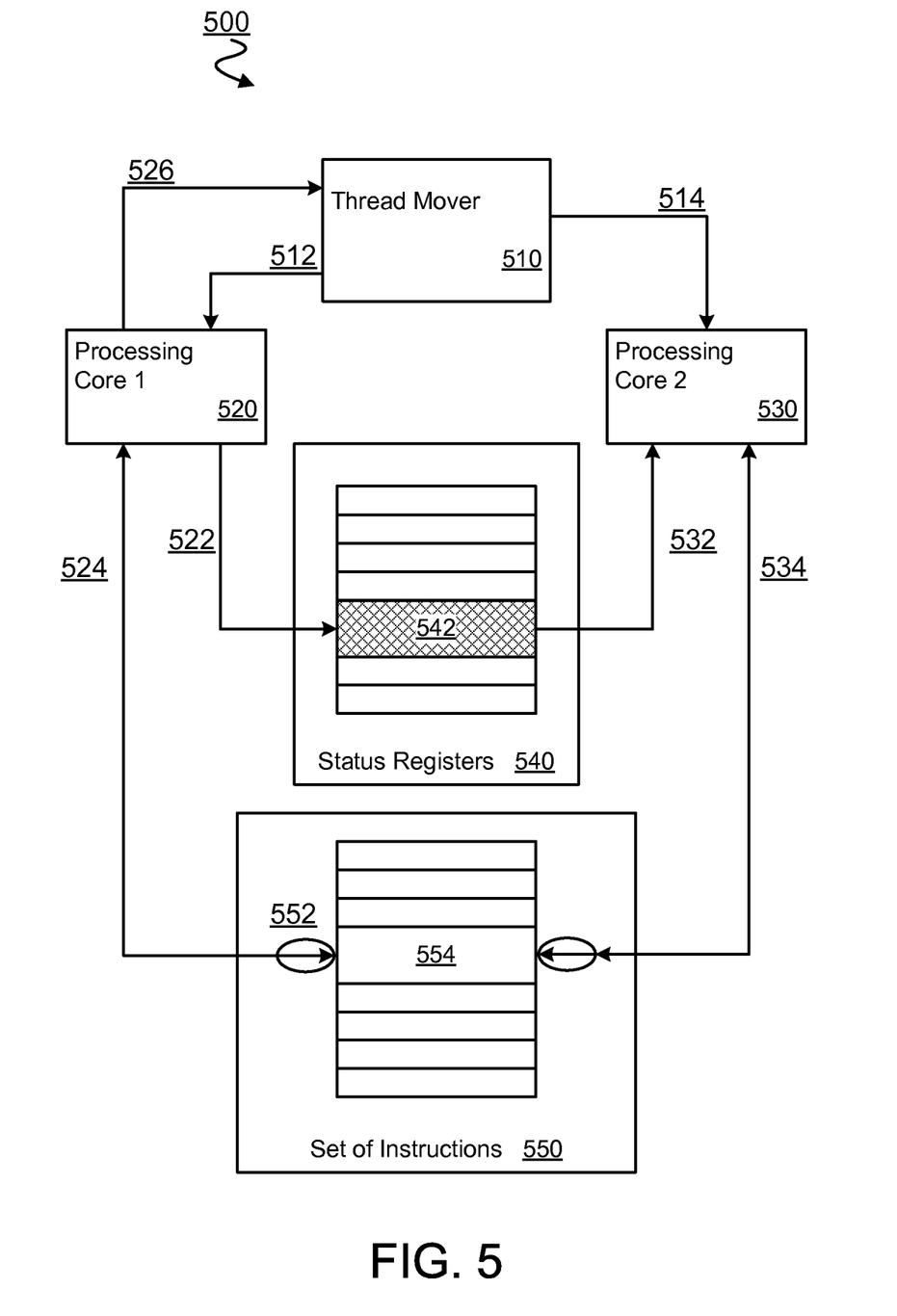
FIG. 5 is a block diagram illustrating a moving of a thread between processing cores according to an embodiment of the invention.

FIG. 5 is a block diagram illustrating a system 500 configured to move a thread according to an embodiment of the invention. For the purposes of illustrating particular features of embodiments of the invention, alternative and/or additional elements and features are not shown which may be found in other embodiments of the invention. In one embodiment, certain elements of system 500 may correspond to elements found in system 300, for example. System 500 is described herein with reference to moving a thread from processing core 1 520 to processing core 530. System 500 includes a processing core 1 520 and a processing core 530 of a plurality of processing cores executing a plurality of threads in parallel. System 500 may further include a thread mover 510 such as one similar to thread mover 360, for example. Thread mover 510 may enable system 500 to selectively move one or more threads between the processing cores of system 500. Thread mover 510 may have already determined—e.g. from a thread moving plan provided from a synchronization calculator such as synchronization calculator 350—a thread to be moved from processing core 1 520 to processing core 2 530. Upon determining the thread to be moved, thread mover 510 may send a message 512 directing the processing core 1 520 to stop further execution the set of instructions 550. In an embodiment of the invention, thread mover 510 may further instruct processing core 1 to make various preparations for the moving of the thread, which may include, for example, providing information to assist the moving of the thread in question to processing core 2.

After receiving message 512, processing core 1 may stop executing a set of instructions 550 corresponding to the thread to be moved—e.g. wherein an instruction 554 in the set of instructions 550 is the first instruction of the thread to be executed upon the thread being moved to processing core 2 530. In one embodiment, processing core 1 520 may send at 522 status information 542 to be stored in status registers 540 of system 500. Status information 542 may include any information (current values of data variables, etc.) which describe a state of the thread to be moved just prior to processing core 1 520 stopping the execution of set of instructions 550. Additionally or alternatively, processing core 1 520 may retrieve at 524 a pointer 552 or other address information indicating the next instruction 554 in the set of instructions 550 which is to be executed by processing core 2 530 when the thread move has been completed and the execution of the thread may resume.

Processing core 1 520 may send to thread mover 510 an acknowledgement 526 of the interrupt 512 which indicates that processing core 2 530 may begin to prepare for the further execution of the thread previously executed by processing core 1 520. Message 526 may further include information needed to assist processing core 2 530 in the further execution of the moved thread. For example, message 526 may include an indication of the location of the status information 542 in status registers 540. Additionally or alternatively, message 526 may include an indication of the pointer 552 where processing core 2 530 may resume the execution of the set of instructions 550.

Upon receiving message 526, thread mover 510 may send a message 514 to initiate the further execution of the set of instructions 550 by processing core 2 530. In an embodiment of the invention, message 514 may include, for example, one or more of an indication of the location of the status information 542 in status registers 540 and an indication of the pointer 552 where processing core 2 530 may resume the execution of the set of instructions 550. Processing core 2 530 may then retrieve at 532 the status information 542 from status registers 540. Processing core 2 530 may further retrieve the pointer 552 to the next instruction 554 to execute in the set of instructions 550, and continue execution of the moved thread based on the current state of the thread as indicated by the retrieved status information 542.

Techniques and architectures for parallel computing are described herein. In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. The apparatus may be specially constructed for the required purposes, or it may comprise a general purpose computer selectively activated or reconfigured by a computer program stored in the computer. The apparatus may comprise a set of instructions stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus. The set of instructions may be executed by one or more processors to cause the one or more processors to perform methods described herein.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   executing a plurality of threads in parallel by a plurality of processing cores, the plurality of threads including a first thread and a second thread, the plurality of processing cores including a first processing core and a second processing core;
   detecting that a processor core executing the second thread is expected to wait idly for a completion of a task of the first thread, including comparing an amount of computing to be performed by the first thread with an amount of computing to be performed by the second thread;
   based on the detecting, identifying one of the plurality of threads as a thread to be moved; and
   in response to the identifying, moving the identified one of the plurality of threads from executing on the first processing core to executing on the second processing core.

2. The method of claim 1, wherein detecting that the processor core executing the second thread is expected to wait idly for the completion of the task of the first thread includes identifying that execution of the first thread is to reach a respective reference point for the first thread after execution of the second thread is to reach a respective reference point for the second thread.

3. The method of claim 2, wherein the identifying that execution of the first thread is to reach the respective reference point for the first thread after execution of the second thread is to reach the respective reference point for the second thread includes identifying a first expected completion time and a second expected completion time, the method further comprising:
   adjusting a performance characteristic based on the first expected completion time and the second expected completion time.

4. The method of claim 3, wherein adjusting the performance characteristic based on the first expected completion time and the second expected completion time includes changing a processing core of the plurality of processing cores from operating at a first frequency to operating at a second frequency.

5. The method of claim 4, wherein the second frequency is calculated as a product of:
   the first frequency;
   the first expected completion time; and
   a multiplicative inverse of a sum of the first expected completion time and the second expected completion time.

6. The method of claim 4, further comprising reducing a processing core supply voltage level based on the changing the processing core of the plurality of processing cores from operating at the first frequency to operating at the second frequency.

7. The method of claim 1, wherein moving the identified one of the plurality of threads isolates an execution of the first thread by one of the first processing core and the second processing core from an execution of another thread by another of the first processing core and the second processing core.

8. A computer readable storage medium having stored thereon instructions which when executed by one or more processors cause the one or more processors to perform a method comprising:
   detecting that a processor core executing a second thread is expected to wait idly for a completion of a task of a first thread, including identifying that execution of the first thread is to reach a respective reference point for the first thread after execution of the second thread is to reach a respective reference point for the second thread, wherein a plurality of processing cores including a first processing core and a second processing core execute in parallel a plurality of threads including the first thread and the second thread;
   based on the detecting, identifying one of the plurality of threads as a thread to be moved; and
   in response to the identifying, moving the identified one of the plurality of threads from executing on the first processing core to executing on the second processing core.

9. The computer readable storage medium of claim 8, wherein the identifying that execution of the first thread is to reach the respective reference point for the first thread after execution of the second thread is to reach the respective reference point for the second thread includes identifying a first expected completion time and a second expected completion time, the method further comprising:
   adjusting a performance characteristic based on the first expected completion time and the second expected completion time.

10. The computer readable storage medium of claim 9, wherein adjusting the performance characteristic based on the first expected completion time and the second expected completion time includes changing a processing core of the plurality of processing cores from operating at a first frequency to operating at a second frequency.

11. The computer readable storage medium of claim 10, wherein the second frequency is calculated as a product of:
   the first frequency;
   the first expected completion time; and
   a multiplicative inverse of a sum of the first expected completion time and the second expected completion time.

12. The computer readable storage medium of claim 10, further comprising reducing a processing core supply voltage level based on the changing the processing core of the plurality of processing cores from operating at the first frequency to operating at the second frequency.

13. The computer readable storage medium of claim 8, wherein moving the identified one of the plurality of threads isolates an execution of the first thread by one of the first processing core and the second processing core from an execution of another thread by another of the first processing core and the second processing core.

14. A system comprising:
   a plurality of processing cores to execute a plurality of threads in parallel, the plurality of threads including a first thread and a second thread, the plurality of processing cores including a first processing core and a second processing core;
   an evaluation unit coupled to the plurality of processing cores, the evaluation unit to detect that a processor core executing the second thread is expected to wait idly for a completion of a task of the first thread, including the evaluation unit to identify a first expected completion time and a second expected completion time;
   a synchronization calculator coupled to the evaluation unit, the synchronization calculator to identify, based on the detecting, one of the plurality of threads as a thread to be moved;
   a thread mover, responsive to the identifying, to move the identified one of the plurality of threads from executing on the first processing core to executing on the second processing core; and
   a power management unit to adjust a performance characteristic based on the first expected completion time and the second expected completion time.

15. The system of claim 14, wherein the power management unit to adjust the performance characteristic based on the first expected completion time and the second expected completion time includes the power management unit to adjust to change a processing core of the plurality of processing cores from operating at a first frequency to operating at a second frequency.

16. The system of claim 15, wherein the second frequency is calculated as a product of:
   the first frequency;
   the first expected completion time; and
   a multiplicative inverse of a sum of the first expected completion time and the second expected completion time.

17. The system of claim 15, wherein the power management unit further to reduce a processing core supply voltage level based on the changing the processing core of the plurality of processing cores from operating at the first frequency to operating at the second frequency.

* * * * *